United States Patent [19]

Ono et al.

[11] 4,213,154
[45] Jul. 15, 1980

[54] FACSIMILE COMMUNICATION SYSTEM

[75] Inventors: Fumitaka Ono; Takayoshi Semasa; Yutaka Ueno; Syuzi Iwata; Ryoichi Ohnishi, all of Amagasaki, Japan

[73] Assignee: Mitsubishi Denki Kabushiki Kaisha, Tokyo, Japan

[21] Appl. No.: 930,505

[22] Filed: Aug. 3, 1978

[51] Int. Cl.$^2$ .............................................. H04N 7/12
[52] U.S. Cl. ..................................................... 358/260
[58] Field of Search ................ 358/133, 135, 138, 260

[56] References Cited

U.S. PATENT DOCUMENTS

| | | | |
|---|---|---|---|
| 2,905,756 | 9/1959 | Graham | 358/135 |
| 4,005,411 | 1/1977 | Morrin | 358/135 |
| 4,144,547 | 3/1979 | Stoffel | 358/133 |

OTHER PUBLICATIONS

Preub-Two Dimensional Facsimile Source Encoding Based on a Makov Model NTZ 28, 1975, H 10, pp. 358-363.

*Primary Examiner*—John C. Martin
*Assistant Examiner*—Joseph A. Orsino, Jr.
*Attorney, Agent, or Firm*—Wenderoth, Lind & Ponack

[57] ABSTRACT

Binary signals from picture elements arranged in rows and columns of the subject copy are successively applied to a group of shift registers and suitably time-delayed under the control of clock pulses so that the signals from reference picture elements for each object picture element simultaneously enter two logic circuits provided for a high and low scanning resolution. The logic circuits calculate predicted values for each object element following respective prediction functions. That circuit for the scanning resolution used delivers the predicted value to an exclusive OR gate also supplied with the actual signal from the same object element. Each time the gate determines a discord with the prediction, a coder delivers coded serial signals having predetermined variable lengths dependent upon the number of pulses counted up to that time by the coder. Also by referring to a picture element or elements farther distant from the object element, generized prediction functions are disclosed.

3 Claims, 14 Drawing Figures

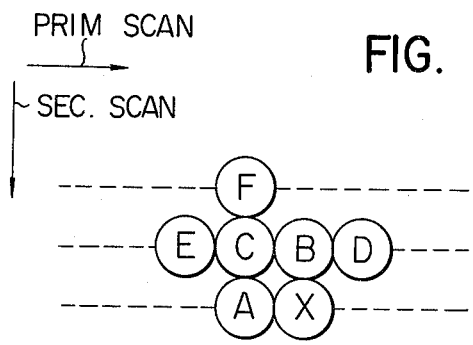
FIG. 1
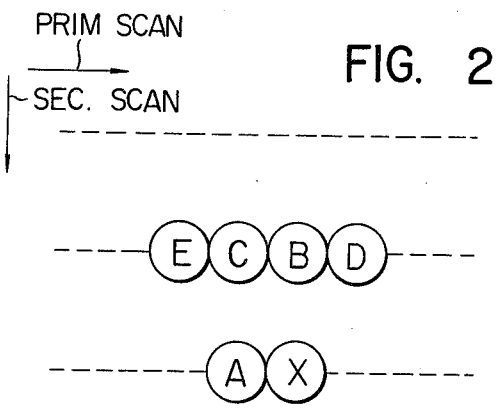
FIG. 2
FIG. 3
| | PAT. OF REF. EL. | | | | | PROB OF OCC. OF WHITE PRED. EL. |
|---|---|---|---|---|---|---|
| | A | B | C | D | E | |
| SCAN RES. 8×8 LINES/mm | 0 | 1 | 1 | 1 | 0 | 0.3809 |
| | 0 | 1 | 1 | 1 | 1 | 0.8112 |
| | 1 | 0 | 0 | 0 | 0 | 0.1855 |
| | 1 | 0 | 0 | 0 | 1 | 0.6272 |
| SCAN RES. 8×8 LINES/mm | 0 | 1 | 1 | 1 | 0 | 0.6402 |
| | 0 | 1 | 1 | 1 | 1 | 0.8695 |
| | 1 | 0 | 0 | 0 | 0 | 0.1485 |
| | 1 | 0 | 0 | 0 | 1 | 0.3919 |

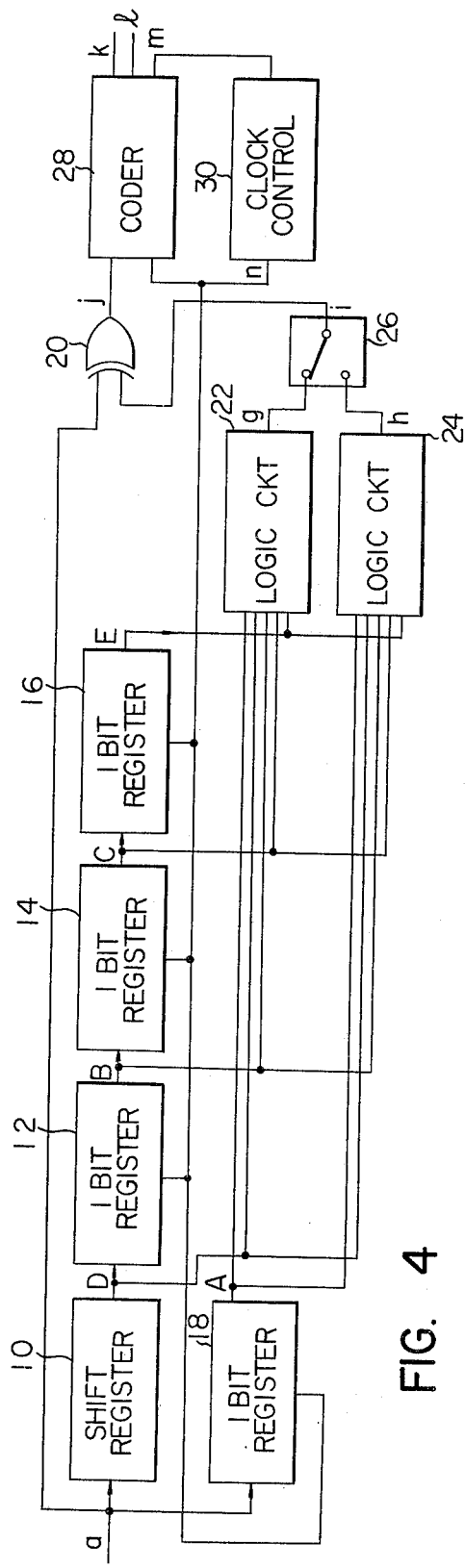

FACSIMILE COMMUNICATION SYSTEM

BACKGROUND OF THE INVENTION

This invention relates to a facsimile communication system for transmitting images of pictures and writings at high speed.

A picture signal originating from any of the picture elements generally has a correlation with picture elements located in the two-dimensional area close to that picture element. The term picture element used herein and in the appended claims refers to the elementary area of any picture and that of any writing. By knowing the peripheral pattern formed by those adjacent picture elements (which are called hereinafter "reference picture elements"), it is possible to decrease the information content which is the effect of the two-dimensional prediction.

In conventional facsimile communication systems employing two-dimensional prediction, the transmitting side includes a single prediction converter for calculating a predicted value for an object picture element from the associated binary picture signals in accordance with a predetermined prediction function and the receiving side also includes a single inverse converter corresponding to the prediction converter. On the other hand, it is desirable to change the scanning resolution depending upon the fineness of the subject copy, that is, the picture or writing to be scanned, encoded and transmitted. When the scanning resolution is changed, the object picture element to be predicted may vary in its distance from and/or its relative positions to its reference picture elements. Under these circumstances, if the prediction function remains unchanged, an optimum prediction can not be effected. In other words, the probability of the occurrence of disagreeing predictions increases. This increases the number of encoding operations when encoding is effected each time a predicted value disagrees with the actual value. Thus the degree of compression has been reduced.

Also in the prior art prediction, the four picture elements surrounding each object picture element have been selected to be the reference picture elements for prediction purposes and it has been assumed that any boundary between white and black picture elements is in the form of a straight line parallel to a row or a column of picture elements. However, pictures and writings include many tilted boundaries running between white and black picture elements, and the predictions are inevitably erroneously effected on both sides of such a tilted boundary.

Accordingly, it is a general object of the present invention to eliminate the disadvantages of the prior art practice was described above.

It is an object of the present invention to provide a new and improved facsimile communication system having a high efficiency by effecting the optimum prediction of picture elements constituting the total picture or writing area.

It is another object of the present invention to provide a new and improved facsimile communication system capable of changing scanning resolution in accordance with the fineness of the picture or writing to be transmitted and effecting optimum prediction of picture elements dependent upon the changed scanning resolution thereby effecting prediction of the picture elements suited to the scanning resolution and improving the data compression factor.

It is still another object of the present invention to provide a new and improved facsimile communication system for preventing erroneous prediction of picture elements to increase the prediction efficiency by increasing the resolution with which a picture or a writing is scanned.

SUMMARY OF THE INVENTION

The present invention provides a facsimile communication system comprising a subject copy formed of a multiplicity of picture elements arranged in rows and columns, means for successively providing predicted values for object picture elements through prediction conversion of the picture signal from each of the object picture signals effected by referring to picture elements located adjacent to the associated object picture element and by following a predetermined prediction function, means for successively comparing the predicted values with actual values of the object picture elements to provide a series of prediction error signals, and means for encoding and transmitting the series of the prediction error signals thereby effecting the optimum prediction conversion.

In a preferred embodiment of the present invention, the facsimile communication system may comprise a first shift register for successively receiving picture element signals from reference picture elements located adjacent to each of the object picture elements, a plurality of serially connected additional shift registers connected to the first shift register to impart time delays to the output therefrom in an incremental manner, a plurality of logic circuits each connected to the outputs of the serially connected additional shift registers to calculate a predicted value for the object picture element in accordance with a predetermined prediction function, a gate circuit for comparing the predicted value from a selected logic circuit with the actual value for the object picture element to provide a prediction error signal, and an coder circuit for effecting a predetermined encoding on the basis of the output from the gate circuit.

BRIEF DESCRIPTION OF THE DRAWINGS

The present invention will become more readily apparent from the following detailed description taken in conjunction with the accompanying drawings in which:

FIG. 1 is a partial, enlarged diagram of a subject copy such as a picture or a writing illustrating the positional relationship between the predicted picture element and the reference picture elements located close thereto;

FIG. 2 is a view similar to FIG. 1 but illustrating the picture elements assuming that the scanning resolution in a secondary scanning direction is halved as compared with FIG. 1;

FIG. 3 is a table indicating the probabilities of making predicted picture elements white in the same subject copy having scanning resolutions of $8 \times 8$ and $8 \times 4$ lines per millimeter respectively for different patterns of reference picture elements;

FIG. 4 is a block diagram of a facsimile communication system constructed in accordance with the principles of the present invention;

FIGS. 5a and 5b are diagrams illustrating how a boundary is drawn between picture elements in accordance with the principles of the prior art;

FIG. 5c and 5d are diagram illustrating boundaries on which prediction errors occur in the prior art systems;

FIGS. 5e, 5f and 5i are diagrams illustrating how the patterns shown in FIGS. 5a and 5c are segregated from each other in accordance with the principles of the present invention;

FIGS. 5g and 5h are diagrams illustrating how the patterns shown in FIGS. 5b and 5d are segregated from each other in accordance with the principles of the present invention; and FIG. 6 is a partial enlarged view of one example of the subject copy in which the effect of the present invention is conspicuous.

DESCRIPTION OF THE PREFERRED EMBODIMENT

As described above, any picture signal generally has a correlation with picture elements located in the two-dimensional area close to that picture element from which the picture signal originates. Therefore, by knowing the peripheral pattern formed of those adjacent picture elements, it is possible to decrease the information content which is the effect of the two-dimensional prediction.

Referring now to FIG. 1 of the drawings, a description will now be made in conjunction with a prediction technique previously employed with binary picture signals each representing either white or black. In FIG. 1 the circle labelled X designates the picture element to be predicted and six circles labelled A, B, C, D, E and F designate reference picture elements located close to the predicted picture element X. More specifically, the reference picture element A is disposed to the left of the predicted element X and the reference elements E, C, B and D are aligned with one another in that horizontal line located just above the line in which the picture elements A and X lie with the reference element B disposed directly above the predicted element X. The reference picture element F lies in the line running just above the line in which the reference picture elements E, C, B and D lie. The prediction of the picture element X is accomplished by using the reference picture elements B, C, D, E and F in view of their positions relative to the predicted picture element X.

All the picture elements consisting the total picture or writing area are arranged in rows and columns and scanned from the left to the right, in a principal scanning direction as shown by the horizontal arrow and from the top to the bottom in a secondary direction as shown by the vertical arrow in FIG. 1.

By referring to the five picture elements A, B, C, D and E, the predicted element X may be sorted in $2^5$ ways according to a reference pattern formed of those five elements. Assuming that when each of the reference picture elements is either white or black and has a value of binary ZERO or ONE respectively, the predicted picture element X has a predicted value $\hat{X}$ as determined by the higher probability of occurrence thereof. That is, the predicted value $\hat{X}$ is determined by using the binary values of the reference picture elements and following a prediction function as will be described hereinafter. Then a prediction error signal Y is calculated according to $$Y = X \oplus \hat{X}$$

where the symbol "cross in a circle" designates the exclusive "OR" operation.

In general pictures or writings the probability of making the prediction error signal Y binary ZERO is extremely high, that is to say, very much larger than one half ($\frac{1}{2}$). A prediction error signal having a value of binary ZERO means that a corresponding predicted signal coincides with the actual signal. Each time a binary ONE, meaning that the predicted value does not coincide with the actual value, occurs in a series of prediction error signals thus obtained, the series of prediction error signals is partitioned to form a run length. The run lengths thus formed are encoded into codes having variable lengths one after another. Then the codes are transmitted to the receiving side.

The receiving side receives the codes transmitted from the transmitting side and decodes the received codes in a predetermined manner. As a result, the receiving side can reproduce a series of signals identical to the series of prediction error signals Y formed on the transmitting side. Then by using a prediction function identical to that used on the transmitting side with picture signals already reproduced, the predicted value $\hat{X}$ is calculated and the corresponding reproduced picture signal X is given by $$X = Y \oplus \hat{X}.$$

This process is repeated to reproduce successive picture signals.

Where the predicted picture element is located on an edge portion of the subject copy involved, for example, in the first line or row thereof, on each of the transmitting and receiving sides, the associated reference picture elements will be forced from the effective transmitted portion of the subject copy. Under these circumstances, the resulting codes are transmitted to the receiving side on the assumption that all those reference picture elements are either white or black.

With respect to the number of bits of the original binary signal encoded in time by such a measure, the number of code bits can be sharply decreased and transmission of the subject copy to the receiving side at a high speed is possible.

In conventional facsimile communication systems of the type referred to, the transmitting side includes one and only one prediction converter for calculating the predicted value X from binary values of the reference picture elements while the receiving side includes one and only one inverse converter corresponding to the prediction converter.

On the other hand, the subject copies involve not only pictures and/or writings including such fine letters that high scanning resolution is required but also those such as manuscripts tolerating a greater or lesser decrease in the scanning resolution. In the latter case, it may be necessary to transmit the subject copy to the receiving side with a decreased scanning resolution by laying stress on the reduction in transmission time while permitting greater or lesser deterioration in the quality of the transmitted copy.

When the scanning resolution is changed, the object picture element to be predicted may vary in its distance from and/or its relative positions to the reference picture elements thereof. Under these circumstances, if the particular prediction function remains unchanged then optimum prediction can not be effected. For example, assuming that the scanning resolution in the secondary scanning direction is twice that used with the arrangement of FIG. 1, the reference picture elements E, C, B and D occupy positions relative to the predicted picture element X as shown in FIG. 2. That is, the row-to-row distance is equal to twice that shown in FIG. 1. Thus the correlation between the reference picture elements E, C, B and D and the predicted picture element X is clearly different from that shown in FIG. 1.

As an example, it is assumed that the particular subject copy is transmitted with a resolution of eight lines per millimeter in each of the primary and secondary scanning directions (which is abbreviated hereinafter to a "resolution of 8×8 lines per millimeter") and also with the resolution in the principal scanning direction remaining unchanged while that in the secondary scanning direction is halved (which is abbreviated hereinafter to a "resolution of 8×4 lines per millimeter"). Under the assumed conditions, the probabilities of making a predicted picture element X white or a binary ZERO have been calculated with different patterns of associated reference picture elements. A part of the results of the calculations is indicated in FIG. 3.

From FIG. 3 it is seen that, for a resolution of 8×8 lines per millimeter, the probability of occurrence of a white predicted picture element is calculated as 0.3809 with a pattern of reference picture elements including A=E=0 and B=C=D=1, while for a resolution of 8×4 lines per millimeter the probability has been calculated as 0.6402 with the same pattern of reference picture elements. That is, the probability of occurrence of a white predicted picture element exceeds ½ with a resolution of 8×4 lines per millimeter and is less than ½ with a resolution of 8×8 lines per millimeter. Thus it is desirable to make the predicted value $\hat{X}$ equal to a binary ZERO or white with the resolution of 8×4 lines per millimeter and to a binary ONE or black with that of 8×8 lines per millimeter.

If the predicted value X is made, for example, a binary ZERO or white for each of those resolutions as in conventional systems then the probability of occurrence of a corresponding prediction error signal Y having a binary ONE becomes large. As described above, a prediction error signal having a value of binary ONE indicates that a discord of prediction in that the associated predicted value does not coincide with the actual value. As also described above, each time a binary ONE occurs in the series of prediction error signals involved, one encoding operation is performed. Therefore an increase in the probability of the occurrence of a prediction error signal having a binary ONE results in an increase in the number of encoding operations and accordingly in a decrease in degree of compression.

In order to encode symbols effectively, it is necessary to encode them in accordance their frequencies of occurrence. Therefore, upon encoding and transmitting binary data provided by scanning the particular subject copy, it is necessary first to learn which of two symbols or binary values has a higher frequency of occurrence at the particular encoding time from the preceding data or the like. Most specifically, when that symbol with a higher frequency of occurrence has been determined, that symbol is assumed to be the predicted value. Then this predicted value is converted to a binary ZERO when the actual value coincides with the predicted value and to a binary ONE otherwise. This always permits an increase in the probability of occurrence of binary ZERO and accordingly the encoding is efficiently effected in a unified manner.

The process as described above is normally called the prediction conversion.

Conventional prediction systems have picked up the four reference picture elements A, B, C and D surrounding the object picture element X to be encoded as shown in FIG. 1 for prediction purposes, and have assumed that any boundary between black and white picture elements is in the form of a straight line parallel to a row or column of picture elements. However, the subject objects such as pictures or writings include many tilted boundaries running between black and white picture elements. As a result, prediction errors have inevitably occurred on both sides of each of the tilted boundaries.

The abovementioned prediction function employed with the well-known prediction conversion technique may be expressed by $$\hat{X} = AB + (A+B)\overline{C} \qquad (1)$$

where $\hat{X}$ designates the predicted value of an object picture element X and A, B and C designate respective picture signals originating from the picture elements labelled the reference characters A, B and C as shown in FIG. 1. Although another prediction function is known which includes a further picture signal D originating from the picture element D shown in FIG. 1, the resulting prediction errors are scarcely changed from those given by the expression (1).

When the picture signals A and B are equal in binary value to each other, the expression (1) indicates that no boundary exists between the object picture element X and the picture element A. On the other hand, when the picture signals A and B are different in binary value from each other, the expression (1) indicates that, by referring to the picture element C, the boundary between the picture elements X and A is supposed to be a straight line parallel to the row of the picture elements as shown in FIG. 5a or parallel to the column thereof as shown in FIG. 5b. However, pictures and writings include, of course, boundaries tilted relative to the rows and columns of the picture elements. For example, a boundary in the form of an inverted L may exist between the picture element A and the picture elements C, B and X as shown in FIG. 5c. Similarly, an L-shaped boundary may exist between the picture element B and the picture elements C, A and X as shown in FIG. 5d. The L-shaped boundary may have a high frequency of occurrence.

With the foregoing concepts in mind, the present invention aims at providing a facsimile communication system capable of giving a high compression with subject copies transmitted with different scanning resolutions.

Also, the present invention contemplates transmission of facsimile information with a high efficiency by giving correct predicted values when a tilted boundary is supposed to exist between black and white picture elements. This is based upon the fact that, if the scanning resolution is rendered sufficiently high a correlation exists between the object picture element and the picture element or elements further spaced therefrom.

Further, on the basis of the presence of a correlation between the object picture element and picture element or elements further spaced therefrom provided that scanning resolution involved is sufficiently high, the present invention aims at the more efficient encoding of picture signals by segregating the cases illustrated in FIGS. 5a and 5b from those of FIGS. 5c and 5d respectively through the addition of a new reference picture element or elements thereby providing different predicted values.

Referring now to FIG. 4, there is illustrated in block diagram from a prediction conversion and encoding unit constructed in accordance with the principles of the present invention to be employed on the transmitting side of facsimile communication systems. The arrangement illustrated operates on the basis that, by employing the five picture elements A, B, C, D and E (see FIGS. 1 and 2) as the reference picture elements, the predicted value $\hat{X}$ that gives the highest rate of prediction coincidence is $$\hat{X}_4 = A \cdot B + \overline{C}(A+B)$$

for a scanning resolution of $8 \times 4$ lines per millimeter and $$\hat{X}_8 = AB + (A+B)(\overline{C}F + CF)$$

for a scanning resolution of $8 \times 8$ lines per millimeter where $$F = \overline{BC}DE + BCD\overline{E}$$

is satisfied. Also the predicted value $\hat{X}$ is suffixed with a reference numeral indicating the resolution in the secondary scanning direction. For example, $\hat{X}_4$ designates the predicted value with the resolution of four lines per millimeter in the secondary scanning direction.

The arrangement of FIG. 4 comprises a shift register 10 and a plurality of registers serially interconnected. In the example illustrated three register 12, 14 and 16 are serially interconnected in the named order with the register 12 connected to the shift register 10. Each picture element provides a binary picture signal a which has a value of binary ONE when it is black and of binary ZERO when it is white. The binary picture signals a from the respective picture elements are digitized with time and successively applied to the shift register 10 which has a number of bit positions equal to the number of picture elements disposed in each line or row minus one, and output signals b from the shift register 10 are successively applied to the serially connected registers 12, 14 and 16 each having a single bit position. The picture signal a is also supplied to both a 1-bit register 18 and one input of an exclusive "OR" gate 20.

The output signal b is further applied to a pair of logic circuits 22 and 24 while output signals c and d from the registers 12 and 14 are applied to both the next succeeding registers and to the pair of logic circuits 22 and 24. The output signal e from the last register 16 is applied to both logic circuits 22 and 24.

The register 18 is connected to the registers 12, 14 and 16 and delivers its output signal f to both logic circuits 22 and 24.

The logic circuit 22 delivers to a transfer switch 26 an output signal g where $$g = cf + \overline{d}(c+f)$$

while the logic circuit 24 delivers to the transfer switch 26 an output signal h where $$h = cf + (c+f)(\overline{d\theta} + d\theta)$$

where $\theta = \overline{cd}be + cbd\overline{e}$ holds.

The transfer switch 26 is shown in FIG. 4 as including a transfer arm engaging a stationary contact connected to the output of the logic circuit 22. Thus the output signal g from the logic circuit 22 is supplied, as an output signal i from the switch 26 to the other input of the exclusive "OR" gate 20. Under these circumstances, it is assumed that the scanning resolution is $8 \times 4$ lines per millimeter. For a given resolution of $8 \times 8$ lines per millimeter the transfer arm of the switch 26 engages that stationary contact connected to the logic circuit 24 to permit the output signal h to be applied to the exclusive "OR" gate 20 as the output signal i.

An output signal j from the exclusive "OR" gate 20 is applied to a coder 28 where it is encoded into a coded signal k whose length is not constant.

The coded signal k appears on an output lead also labelled k and further a train of clock pulses l is developed on another output lead also labelled l. The output leads k and l are connected to the next succeeding circuit, for example, an interface buffer memory for the associated transmission channel although such a circuit and the transmission channel are not brevity only for purposes of illustration. The buffer memory utilizes the clock pulses l to read out the coded signals k. The coder 28 also applies a indication signal m to a clock control 30 indicating that the coder 28 is delivering the coded signals k.

The clock control 30 delivers a train of clock pulses n to the registers 12, 14, 16 and 18 and the coder 28. The clock train has a pulse repetition period equal to that of the picture signals formed by scanning the associated picture elements in the principal scanning direction or the row direction for the reasons which will be apparent later. The train of clock pulses n enters the register 12 to delay the output signal c by one pulse repetition period thereof with respect to the output signal b from the shift register 10. The train of clock pulses n entering the registers 14 and 16 respectively operates to delay the output signals d and e therefrom by two and three pulse repetition periods of the clock pulses n with respect to the output signal b from the shift register 10. Similarly, the register 18 responds to the train of clock pulses n applied thereto to delay the associated picture signal a by one pulse repetition period of the clock pulses n and to deliver the delayed picture signal, as the output signal f, to the logic circuits 22 and 24.

The operation of the arrangement as shown in FIG. 4 will now be described. Prior to scanning the particular subject copy, the required scanning resolution is determined. When the resolution determined to be $8 \times 4$ lines per millimeter, the transfer arm of the switch 26 is connected to the side of the output signal g as shown in FIG. 4. On the other hand, the transfer switch 26 arm is connected to the side of the output signal h for a resolution of $8 \times 8$ lines per millimeter. Also all the registers 10, 12, 14, 16 and 18 are put in their reset state in which they are clear.

When the scanning is started and the train of shifting clock pulses l is delivered from the clock control 30, digitized binary picture signals a are successively applied to both the shift register 10 and the register 18.

Assuming that the binary picture signal a originates from the predicted picture element X as shown in FIG. 1 at a given time point, the correspondence of the signals a through j appearing at that same time point to the picture elements on the subject copy as shown in FIG. 1 will now be discussed. First, the signal b from the shift register 10 corresponds to the picture element D lying in the preceding line and ahead of the picture element X by one picture element in the principal scanning direction because the shift register 10 includes a number of bit positions equal to the number of the picture elements in each line minus one. Then, since each of the registers 12, 14, 16 and 18 includes a single bit position, it is seen that the signals c, d, e and f correspond to the picture elements B, C, E and A respectively.

In the example illustrated, the output signal g from the logic circuit 22 passes through the switch 26 and is delivered from the latter as the output signal i. Since the signal g is the predicted value $\hat{x}_4$ for a resolution of 8×4 lines per millimeter, the output signal j from the exclusive "OR" gate 20 provides a prediction error signal Y expressed by $$Y = X \oplus \hat{x}_4.$$

On the other hand, the coder 28 which has been initially set in its null state counts the clock pulses 1. When the exclusive "OR" gate 20 produces an output signal j having a value of binary ONE indicating a discord of the prediction, the coder 28 delivers to the output lead k a variable length code word dependent on the number of pulses counted up to that time by the coder 28. In this case, the counted number of pulses corresponds to the run length. At the same time, the coder 28 delivers to the output lead m pulses for shifting the coded signal k. During the delivery of the shifting pulses k, the signal m is a binary ONE and the clock pulses n are set to a value of binary ZERO in the clock control 30.

The coder 28 responds to the completion of devlivery of the shifting pulses to reset the count of the clock pulses to zero after which the clock control 30 again delivers binary ONE clock pulses n until the next succeeding encoding is effected.

In this way, the binary picture signals a are successively subject to the prediction conversion and encoding.

For a given resolution of 8×8 lines per millimeter, the switch 26 has the transfer arm engaging the other stationary contact connected to the logic circuit 24, and therefore the output signal j from the exclusive OR gate 20 becomes the prediction error signal expressed by $$Y = X \oplus \hat{X}_8$$

where $\hat{X}_8$ designates the predicted value.

Then the process as described above in conjunction with the resolution of 8×4 lines per millimeter is repeated to effect the prediction conversion and encoding of binary picture signals with a resolution of 8×8 lines per millimeter.

The coded picture signals thus processed on the transmission side are successively transmitted to the receiving side which is inherently different from that of conventional facsimile communication systems only in the following respects:

In order to reproduce the picture signals from both the binary picture signals originating from the picture elements already reproduced and the decoded prediction error signals, the prediction inverse-converter disposed on the receiving side includes a pair of prediction devices having functions $\hat{X}_4$ and $\hat{X}_8$ respectively and a selector for selecting either one of the prediction devices in accordance with that resolution selected on the transmission side before receiving the coded signals from the transmission side.

As described above, if the scanning resolution is sufficiently high then a picture element to be predicted has a correlation with a picture element or elements further spaced therefrom. Assuming that the picture element C has a binary value equal to that of the picture element B it is supposed that a boundary between white and black picture elements will run either between the picture elements A and X as shown in FIG. 5a, or between the picture elements C, B and X and the picture element A as shown in FIG. 5c. By referring to another picture element E located to the left of the picture element C more distant from the picture element X, it is supposed that the boundary as shown in FIG. 5a will change to that shown in FIG. 5e wherein no boundary is shown as existing between the picture elements C and E. Also the boundary as shown in FIG. 5c will change to that shown in FIG. 5f wherein the boundary is shown as having one portion thereof running between the picture elements C and E.

By taking account of the change in the correlation between the predicted and the reference picture elements through the addition of a reference picture element spaced farther from the predicted element, the present invention contemplates more accurate prediction of the picture elements.

It is assumed that each of the picture elements arranged in rows and columns has coordinates (m, n) that is, it is located at the intersection of the m-th column and n-th row and produces a picture element signal $X_{m,n}$ having a value of binary ZERO or ONE where m and n are any integers. Under the assumed conditions, the present invention calculates a predicted value $\hat{X}_{m,n}$ of the signal $X_{m,n}$ in accordance with the following expression:

$$\hat{X}_{m,n} = X_{m-1, n} \cdot X_{m,n-1} + (\overline{X}_{m-1, n-1} \cdot T \quad (2)$$
$$+ X_{m-1, n-1} \cdot \overline{T}) \cdot (X_{m-1,n} + X_{m,n-1})$$

where $$T = X_{m,n-1} \cdot X_{m-1,n-1} \cdot X_{m+1,n-1} \cdot \overline{X}_{m-2,n-1}$$
$$+ \overline{X}_{m,n-1} \cdot \overline{X}_{m-1,n-1} \cdot X_{m+1,n-1} \cdot \overline{X}_{m-2,n-1}$$
$$+ X_{m,n-1} \cdot X_{m-1,n-2} \cdot \overline{X}_{m-1,n-1}$$
$$+ \overline{X}_{m,n-1} \cdot \overline{X}_{m-1,n-2} \cdot X_{m-1,n-1}$$

and $\overline{X}$ and $\overline{T}$ respectively designate the inversion of the picture element signals X and T.

It may be supposed that a boundary between white and black picture elements will include a beginning portion running between the picture elements E and C, an intermediate portion running between the picture elements C and B and the picture elements A and X and an end portion existing between the picture elements B and D as shown in FIG. 5i. Therefore, it is desirable to use five reference picture elements A, B, C, D and E (see FIG. 1 or 5i). In this case, the expression (2) may be reduced to $$\hat{X} = AB + (A+B)(\overline{CT}_1 + CT_1) \quad (3)$$

where $$T_1 = BCD\overline{E} + \overline{BC}\overline{D}E + BF\overline{C} + \overline{B}FC$$

holds.

On the other hand, it is assumed that the picture element C has a binary value equal to that of the picture element A but different from that of the picture element B. Then it can be supposed that the boundary between white and black picture elements will run between the picture elements C and A and the picture elements B and X as shown in FIG. 5b or that such a boundary will run between the picture elements C and X and the picture element B in an L shape as shown in FIG. 5d. By referring to another picture element F located just above the picture element C (see FIG. 1), the boundary as shown in FIG. 5b will change to a boundary running between the picture elements F, C and A and the picture elements B and X as shown in FIG. 5g. Also the boundary as shown in FIG. 5d will change to a stepped boundary running between the picture elements F and C, between the picture elements C and B and between the picture elements B and X as shown in FIG. 5h. That is, no boundary exists between the picture elements F and in FIG. 5g while a boundary exists between the picture elements F and C in FIG. 5h.

Under these circumstances, the expression for the T may be transformed to the following expression:

$$T = X_{m,n-1} \cdot X_{m-1,n-2} \cdot \overline{X}_{m-1,n-1} + \overline{X}_{m,n-1} \cdot \overline{X}_{m-1,n-2} \cdot X_{m-1,n-1}.$$

With the four reference picture elements A, B, C and F used, a predicted value $\hat{X}$ may be calculated from the following expression $$\hat{X} = AB + (A+B)(\overline{CT_2} + CT_2) \quad (4)$$

where $$T_2 = BF\overline{C} + \overline{BF}C$$

holds.

If it is desirable to combine the effects exhibited by both the expressions (3) and (4) respectively then a predicted value $\hat{X}$ may be calculated in accordance with the expression $$\hat{X} = AB + (A+B)(\overline{CT_3} + CT_3) \quad (5)$$

where $$T_3 = BC D\overline{E} + \overline{BCD}E + BF\overline{C} + \overline{BF}C$$

holds.

FIG. 6 shows a part of a subject copy such as a picture of writing including an inclined boundary. In FIG. 6 the hatched squares designate a black portion and the remaining squares designate a white portion. The use of the conventional prediction expression (1) results in prediction errors appearing at the five picture elements referenced by squares I, V, VI, X and XI among the twelve picture elements labelled, I through XII.

On the other hand, the use of the prediction expression (5) according to the present invention results in no prediction error. Thus encoding with a high data compression factor can be expected.

Upon electronically calculating the predicted value according to the expression (2) and/or the expression (3), it is necessary to provide an additional 1-bit FLIP-FLOP in order to use the further picture element E as a reference and/or an additional one-line memory in order to use the picture element F as a reference, as compared with the prior art practice. However, the manner in which such a logic function for calculating a predicted value ca be realized by digital circuit elements is well known therefore a description of such digital circuit elements is omitted herein.

From the foregoing it is seen that the present invention provides a facsimile communication system employing a prediction method suitable for the particular resolution with which picture elements of a picture or a writing involved are scanned thereby improving the a data compression factor.

While the present invention has been described in conjunction with a few preferred embodiments thereof it is to be understood that numerous changes and modifications may be resorted to without departing from the spirit and scope of the present invention. For example, while the present invention has been described in terms of an encoding process independent of the preliminarily selected scanning resolution and remaining unchanged but considering that the rate of coincidence of prediction depends upon the scanning resolution, the present invention may be operatively combined with means for selecting an encoding process in accordance with the particular scanning resolution. This measure results in a facsimile communication system effecting a higher compression. Also instead of the manually operated transfer switch 26, an electrically controllable analog switch or the like may be used to automatically change the scanning resolution in response to an automatic discrimination between that portion of the particular subject copy requiring a high scanning resolution and that portion of the same copy permitting scanning with a low scanning resolution. Further while the present invention has been described in conjunction with a binary picture signal, it is to be understood that the invention is not restricted thereby or thereto and that it is equally applicable to the communication of multi-valued picture signals having three values or more.

What we claim is:

1. A facsimile communication system comprising: a subject copy formed of a multiplicity of picture elements arranged in rows and columns; means for successively providing predicted values for object picture elements through the prediction conversion of a picture signal from each of said object picture elements effected by referring to the associated picture elements located adjacent to each object picture element including a logic circuit for calculating a binary predicted value $X_{m,n}$ of a picture element signal $\hat{X}_{m,n}$ for an object picture element located at an intersection of the m-th column and n-th row in accordance with a prediction function expressed by $$\hat{X}_{m,n} = X_{m-1,n} \cdot X_{m,n-1}$$
$$+ (X_{m-1,n-1} \cdot T + X_{m-1,n-1} \cdot T) \cdot$$
$$(X_{m-1,n} + X_{m,n-1})$$

where $$T = \underline{X}_{m,n-1} \cdot \underline{X}_{m-1,n-1} \cdot \underline{X}_{m+1,n-1} \cdot \overline{X}_{m-2,n-1}$$
$$+ \overline{X}_{m,n-1} \cdot X_{m-1,n-1} \cdot \overline{X}_{m+1,n-1} \cdot X_{m-2,n-1}$$
$$+ \underline{X}_{m,n-1} \cdot \underline{X}_{m-1,n-2} \cdot \overline{X}_{m-1,n-1}$$
$$+ \overline{X}_{m,n-1} \cdot \overline{X}_{m-1,n-2} \cdot X_{m-1,n-1}$$

and $\overline{X}$ and $\overline{T}$ designate inversions of the X and T respectively; means for successively comparing said predicted values with actual values of said object picture elements to provide a series of prediction error signals, and means for encoding and transmitting said series of said prediction error signals.

2. A facsimile communication system comprising: a subject copy formed of a multiplicity of picture elements arranged in rows and columns; means for successively providing predicted values for object picture elements through the prediction conversion of a picture signal from each of said object picture elements effected by referring to the associated picture elements located adjacent to each object picture element including a logic circuit for calculating a binary predicted value $\hat{X}_{m,n}$ of a picture element signal $X_{m,n}$ for an object picture element located at an intersection of the m-th column and n-th row in accordance with a prediction function expressed by $$\hat{X}_{m,n} = X_{m-1,n} \cdot X_{m,n-1} + (\overline{X}_{m-1,n-1} \cdot \overline{T} + X_{m-1,n-1} \cdot T) \cdot (X_{m-1,n} + X_{m,n-1})$$

where $$T = X_{m,n-1} \cdot X_{m-1,n-1} \cdot X_{m+1,n-1} \cdot \overline{X}_{m-2,n-1} + \overline{X}_{m,n-1} \cdot \overline{X}_{m-1,n-1} \cdot \overline{X}_{m+1,n-1} \cdot X_{m-2,n-1}$$

and $\overline{X}$ and $\overline{T}$ are the inversion of the X and T respectively; means for successively comparing said predicted values with actual values of said object picture elements to provide a series of prediction error signals; and means for encoding and transmitting said series of said prediction error signals.

3. A facsimile communication system comprising: a subject copy formed of a multiplicity of picture elements arranged in rows and columns; means for successively providing predicted values for object picture elements through the prediction conversion of a picture signal from each of said object picture elements effected by referring to the associated picture elements located adjacent to each object picture element including a logic circuit for calculating a binary predicted value $\hat{X}_{m,n}$ of a picture element signal $X_{m,n}$ for an object picture element located at an intersection of the m-th column and n-th row in accordance with a prediction function expressed by $$\hat{X}_{m,n} = X_{m-1,n} \cdot X_{m,n-1} + (\overline{X}_{m-1,n-1} \cdot \overline{T} + X_{m-1,n-1} \cdot T) \cdot (X_{m-1,n} + X_{m,n-1})$$

where $$T = X_{m,n-1} \cdot X_{m-1,n-2} \cdot \overline{X}_{m-1,n-1} + \overline{X}_{m,n-1} \cdot \overline{X}_{m-1,n-2} \cdot X_{m-1,n-1}$$

and $\overline{X}$ and $\overline{T}$ are the inversion of the X and T respectively; means for successively comparing said predicted values with actual values of said object picture elements to provide a series of prediction error signals; and means for encoding and transmitting said series of said prediction error signals.

* * * * *